July 6, 1954 C. JELINEK, JR 2,683,186

FACSIMILE RECORDING APPARATUS

Filed June 6, 1951 3 Sheets-Sheet 1

*INVENTOR.*
C. JELINEK, JR.

*BY*

ATTORNEY

July 6, 1954 C. JELINEK, JR 2,683,186

FACSIMILE RECORDING APPARATUS

Filed June 6, 1951 3 Sheets-Sheet 2

INVENTOR.
C. JELINEK, JR.
BY A. A. Thomas
ATTORNEY

July 6, 1954 C. JELINEK, JR 2,683,186

FACSIMILE RECORDING APPARATUS

Filed June 6, 1951 3 Sheets-Sheet 3

INVENTOR.
C. JELINEK, JR.

BY A. A. Thomas

ATTORNEY

Patented July 6, 1954

2,683,186

UNITED STATES PATENT OFFICE 2,683,186

FACSIMILE RECORDING APPARATUS

Charles Jelinek, Jr., Verona, N. J., assignor to The Western Union Telegraph Company, New York, N. Y., a corporation of New York Application June 6, 1951, Serial No. 230,123

15 Claims. (Cl. 178—5)

My invention relates to the art of facsimile telegraph communication, and its main purpose is to provide improved recording equipment mounted on a car or any other kind of vehicle adapted to operate as a mobile telegraph station for the receipt and delivery of telegrams transmitted by radio from a central office.

Considered in its practical aspect, the present invention embodies certain vital improvements in the control and operation of the car recorder disclosed in the pending application of Hallden et al., Ser. No. 6,847, filed February 7, 1948. The basic purpose of these improvements is to cut down the standby drain on the battery that supplies all the power for the recorder, whereby the life of the battery is prolonged and the margin of operation so improved that the equipment will function with a greater factor of safety and reliability.

The facsimile equipment carried by the recording car in the aforesaid Hallden application comprises various power units and control relays which are all fed from a 6-volt storage battery. It was found that continuous operation of that equipment in the field resulted in excess battery drain and in too-close marginal operation of some electrical parts which included many relays. Hence, the immediate object of this invention is to limit the battery drain to a more practical amount by reducing the number of current-consuming units and providing novel control circuits which permit turning off much of the equipment to keep the machine in standby condition.

The practical result of these improvements is a simpler and therefore less expensive recording equipment which operates more economically and more safely between the marginal limits set by the battery voltage.

Figure 1:
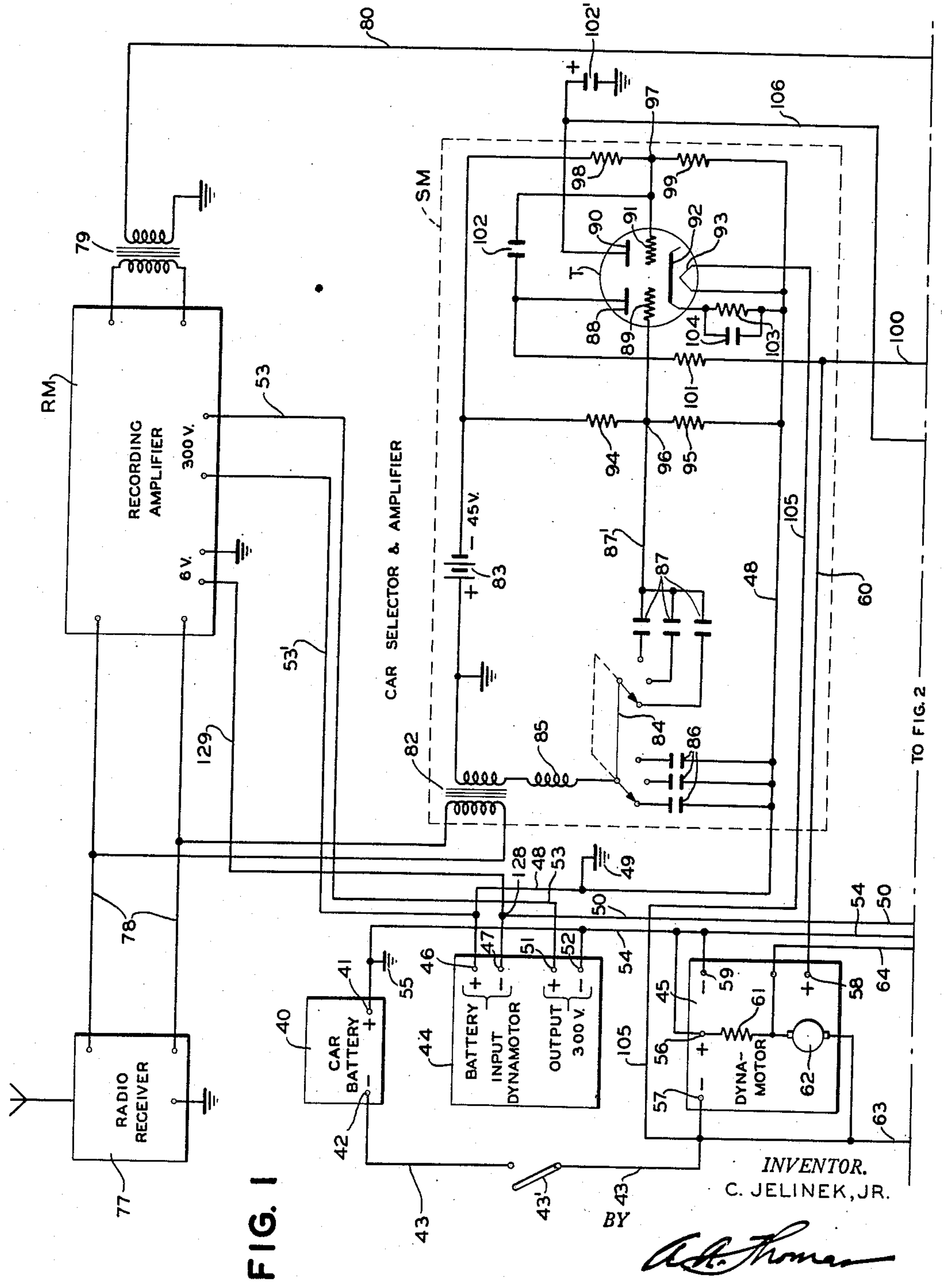
Figure 2:
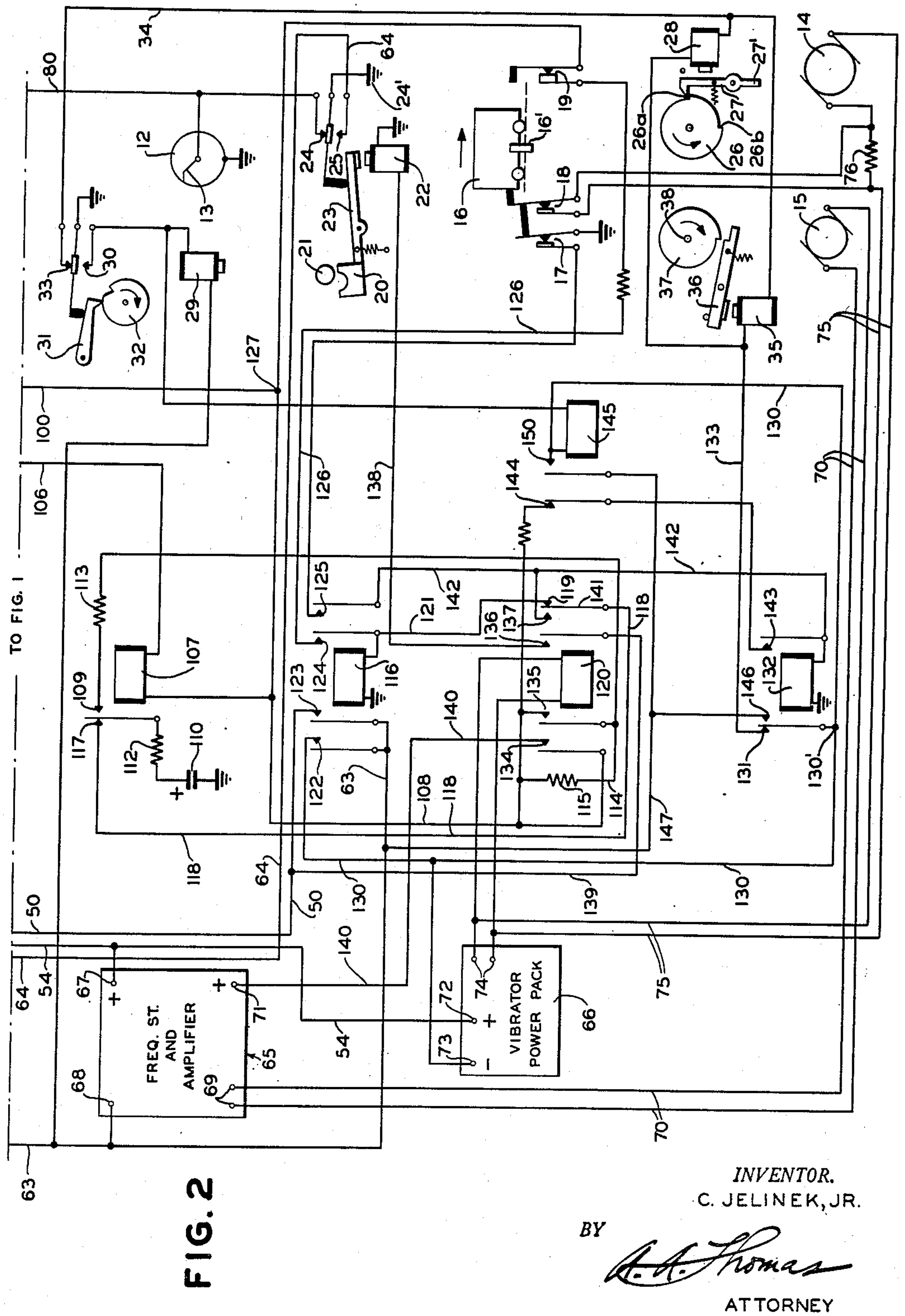
Figures 3, 4:
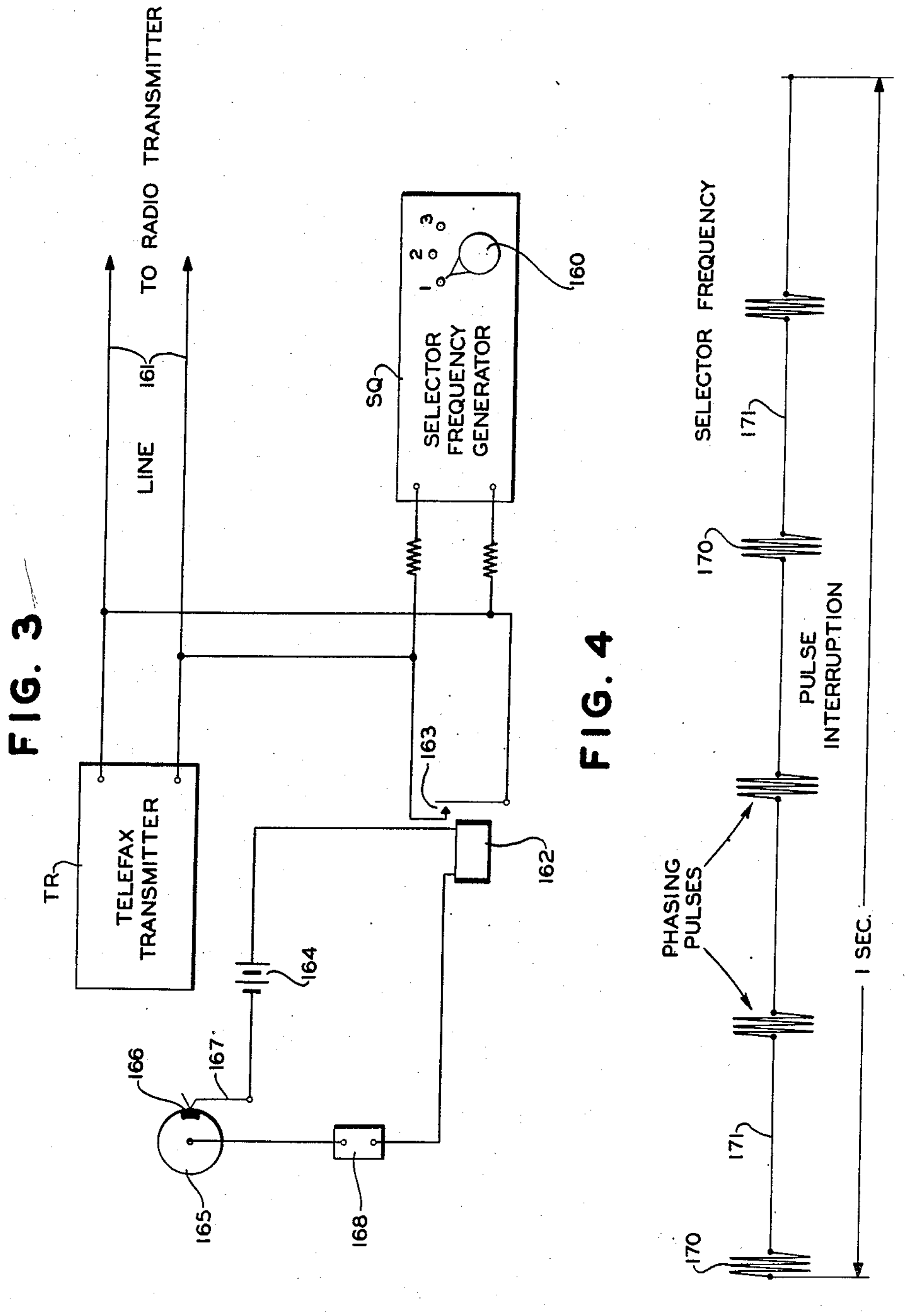

The novel features and practical advantages of this invention will be fully understood from a description of the accompanying drawings, in which:

Figs. 1 and 2 taken together illustrate diagrammatically the essential circuits and parts included in the recording equipment;

Fig. 3 is a simplified diagram of circuits at the transmitter for producing short phasing pulses of the same frequency as the selector signals; and Fig. 4 represents an explanatory wave diagram of the phasing pulses.

In the description of this invention, it will be convenient to assume that the recorder connected with the circuits is like that disclosed in the Hallden application referred to. Accordingly, I need only mention briefly such parts of the machine as are indicated schematically in Fig. 2.

This recorder is of the continuous sheet type in which a definite length of paper is wrapped into a stationary cylinder 12 for inside scanning by a recording stylus 13 which is rotated and at the same time fed axially through the paper cylinder. A power motor 14 feeds the stylus slowly lengthwise of the paper, while a synchronous motor 15 rotates the stylus at high recording speed.

The stylus 13 is mounted on a slidable carriage 16 driven by the motor 14. This carriage controls three switches 17, 18 and 19. The switches 17 and 18 normally tend to be open and are held closed by the carriage in its initial position. The switch 19 is normally closed and is opened by the carriage at the end of its scanning movement.

A half nut 20 on the carriage 16 connects the latter to a screw shaft or feed screw 21 when the magnet 22 is energized to operate a pivoted arm 23 on which the half nut is mounted. The shaft 21 may also be considered as the power shaft geared to the motor 14. The arm 23 controls two switch contacts 24 and 25. Normally the contact 24 is grounded at 24′, and when the magnet 22 is energized, this ground is transferred to contact 25.

The power motor 14 drives a cam assembly of which only the start-and-stop cam 26 is shown in Fig. 2. The cam 26 has two steps or shoulders 26*a* and 26*b* arranged to lock against a pivoted latch 27 under the control of a magnet 28. A spring normally holds the latch 27 against the cam 26, and in the normal or rest position of the cam assembly the latch engages the step 26*a*. The motor 14 is connected to the cam assembly through a friction clutch (not shown), so that the motor shaft 21 can rotate even when the cam 26 is held stationary by the latch 27.

When the magnet 28 is energized, it causes the latch 27 to be momentarily withdrawn or tripped to release the cam 26 for rotation. During this momentary withdrawal of latch 27, the step 26*a* has moved past the latch by the time the latter snaps back against the cam 26, which thus can rotate (even with the magnet 28 remaining energized) until the returning latch encounters the second cam step 26*b*, whereupon the cam assembly is again stopped.

In Fig. 2 the latch 27 is shown for simplicity as the armature of magnet 28, but in the actual machine it is operated by tripping connections which form no part of the present invention and are fully described in the Hallden application. For the present purpose I need only point out that the rotation of cam 26 from normal or standby position (as indicated in Fig 2) until the step 26b encounters the latch 27, causes certain mechanism to close a flexible wrapper which shapes a definite length of recording paper into the cylinder 12. The cam 26 is held locked by the step 26b to keep the wrapper closed during a recording cycle.

At the close of a recording operation the stylus carriage 16 retracts to normal position, and during this return movement the carriage mechanically trips the latch 27 momentarily to release the cam 26 which now rotates until the step 26a is again caught by the latch. This latch tripping mechanism operated by the carriage is fully set forth in the Hallden application and is schematically represented in Fig. 2 by a projection 16′ on carriage 16 and an extension 27′ on the latch 27.

The rotation of cam 26 upon its release by the return of carriage 16 causes the wrapper to be automatically opened, whereupon fresh paper is fed into the wrapper, the recorded sheet is pushed out, and a knife cuts it off. This knife (not shown) is operated by a solenoid 29 which is energized when a switch contact 30 is closed by a pivoted arm 31. A cam disk 32 connected with the paper feed mechanism holds the arm 31 in raised position to keep the contact 30 open and hold another contact 33 closed. When the recorded telegram has been projected out of the opened wrapper, a new supply of paper is fed into the wrapper until the end of arm 31 drops momentarily into a notch in the rotating disk 32, whereupon the contact 33 is opened (for a purpose explained later) and the contact 30 is closed to energize the solenoid 29 which operates the knife to cut off the telegram.

The normally closed contact 33 is connected to a conductor 34 which goes to one side of a phasing magnet 35. When this magnet is energized, it rocks its armature 36 into locking engagement with a cam disk 37 fixed on the stylus shaft 38, thereby preventing rotation of the stylus. When the magnet 35 is deenergized, a spring pulls the arm 36 away from disk 37 and thereby releases the stylus shaft for rotation. It will be noted that the magnets 28 and 35 are connected in parallel and always operate in unison.

The foregoing brief description of the recorder connected in the receiving end of the system is sufficient for an understanding of the novel control and operating circuits now to be described in detail.

All the electric power required for the recorder equipment (except that used for negative grid bias) comes from a 6-volt storage battery 40 which has its plus terminal 41 grounded and its negative terminal 42 connected to a lead 43. A hand switch 43′ turns the battery on and off. Two dynamotors 44 and 45 are fed from the battery through the following circuits:

The dynamotor 44 has two battery input terminals 46 and 47. The plus terminal 46 is connected to a conductor 48 which is grounded, as indicated at 49, and the negative terminal 47 is connected to a conductor 50. The output end of dynamotor 44 is at the terminals 51 and 52. The plus output terminal 51 is connected by wire 53 to the power input terminal of a recording amplifier RM, whose other input wire 53′ goes to the grounded battery input terminal 46. The negative output terminal 52 of dynamotor 44 goes to a conductor 54 which is also connected to the grounded battery terminal 41. The conductor 54 is therefore permanently grounded, as indicated at 55, and is common to the plus battery terminal 41 and the negative output terminal 52 of dynamotor 44. In the present installation of this equipment the output potential between the terminals 51—52 is 300 volts. The dynamotor 44 is a standard device of well known construction and therefore requires no description. It is enough to say that it is a combined motor-generator fed by the 6-volt battery 40 and delivering the required voltage at the output terminals 51—52.

The second dynamotor 45 has battery input terminals 56—57 and output terminals 58—59, the terminals 56 and 58 being of plus polarity. The plus terminal 56 goes to the grounded positive lead 54, and the other terminal 57 is connected to the negative battery post 42 by conductor 43. The plus output terminal 58 is connected to a lead 60 and the negative terminal 59 goes to the grounded conductor 54. The dynamotor 45 has a resistor 61 in series with the armature winding of its motor 62. One side of the motor armature is connected to a conductor 63 and thereby to the negative side of battery 40. A conductor 64 shorts out the resistor 61 to let the motor 62 run at full speed when the half-nut magnet 22 is energized and closes the switch contact 25.

Referring to Fig. 2, there are two additional power units 65 and 66 energized by the battery 40. The block 65 represents a frequency standard and amplifier of well known construction requiring no description. It is enough to point out that 67 and 68 are the plus and minus input terminals from the battery 40, and the synchronous output goes to a pair of terminals 69 which are connected by wires 70 to the synchronous motor 15 that rotates the stylus. The terminal 71 is for the plate input of the tubes in unit 65, this plus voltage being supplied by the dynamotor 45 over circuits to be described later.

The unit 66 is a vibrator power pack or converter, also a standard article not necessary to describe. The battery input goes to terminals 72—73 and the A. C. output comes from terminals 74 which are connected by wires 75 to the power motor 14. A resistor 76 in the circuit of this motor is kept shorted out by switch 18 as long as the stylus carriage 16 is in standby or initial position. This gives the motor 14 a burst of power at the start, so that it can take the full load of the screw shaft 21 and the cam assembly 26. After the scanning starts, the switch 18 is opened and the motor 14 slows down to the desired scanning speed.

When the battery switch 43′ is closed, the only one of the four power units 44, 45, 65 and 66 to be energized immediately is the dynamotor 45 which is connected directly to the battery 40. However, because of the resistor 61 in the armature circuit of its motor 62, the dynamotor 45 will run only at half speed, thereby conserving battery current.

The recording equipment on the car receives the control and facsimile signals through a radio receiver 77 which has its output lines 78 connected to the input of the recording amplifier RM. As such amplifiers are well known in the art, I need not describe its construction and operation. The power for the amplifier tubes comes from the dynamotor 44, the filament voltage is derived from battery 40, and the amplified signal output goes to a transformer 79. One side of the secondary coil of this transformer is connected by a wire 80 to the stylus 13 and to the switch contact 24, which normally shorts out the stylus.

We are to assume here, as fully explained in the Hallden application, that the main office can select any one of several recording cars to receive a telegram, this selection being done by sending out a steady tone of fixed duration (say, two seconds), on a frequency assigned to that particular car. For this purpose each car is provided with a selector which is sharply tuned to the assigned calling frequency. In Fig. 1 this selecting and amplifying unit is diagrammatically illustrated within the dotted rectangle SM. The input transformer 82 has its primary coil connected to the output line 78 of radio receiver 77. The secondary coil of transformer 82 connects at one side to the grounded plus terminal of a negative bias battery 83, and the other side of this coil goes to a selector switch 84 through an inductor 85.

The adjustable switch 84 controls the connections of two sets of condensers 86 and 87. The condensers 86 are conected at one side to the grounded conductor 48, and the condensers 87 have a common connection 87'. The number of condensers in each set depends on the number of cars serviced from the main office. In the present instance the selector unit is designed for a three-car fleet and is therefore shown with three condensers in each group. The inductor 85 and the selected condenser 86 provide a series tuned resonant path which has a different frequency for each car.

The selector-amplifier unit SM contains a twin triode T with two sets of plate and grid electrodes 88—89 and 90—91, and a common cathode 92 which is heated by a filament 93. The plate 88 and grid 89 operate as the selector half of the tube, while the plate 90 and grid 91 are in the amplifier side of the tube. The negative potential of battery 83 (in this case 45 volts) is constantly impressed on grid 89 through a resistor 94, which is in series with a resistor 95 connected to the grounded conductor 48. The point 96 between the series resistors 94—95 may be assumed to be 22.5 volts, which constitutes a permanent negative bias on grid 89. It is to be noted that the condensers 87 which are connected to the junction point 96, determine the amplitude of the selector signal.

The grid 91 in the amplifier half of tube T is connected to the voltage point 97 (about 25 volts negative) between the series resistors 98—99. The resistor 98 is connected to the negative side of the bias battery 83, and the other resistor 99 goes to the grounded wire 48, which is permanently connected to the plus terminal of battery 40. The plate 88 of tube T is connected to a conductor 100 which goes by wire 60 to the plus output terminal 58 of dynamotor 45. The plus voltage of terminal 58 is impressed on the plate 88 through a resistor 101. The plate 88 is coupled to the grid 91 through a condenser 102, whereby the amplified output of the selector half of tube T is impressed on the input grid of the amplifier half of the tube. A grounded by-pass condenser 102' acts to steady the current flow through the tube.

The common cathode 92 of tube T is connected to the grounded plus conductor 48 through a decoupling circuit consisting of a resistor 103 shunted by a condenser 104 of large capacity which acts as a by-pass and prevents the tube from oscillating. The resistor 103 in the cathode circuit saves the tube from being damaged in case of accidental failure of the bias battery 83. The heating filament 93 for cathode 92 has one side connected to the grounded plus terminal 41 of battery 40 through conductor 48, and the other side of the filament goes through a conductor 105 to the negative battery terminal 42.

The plate 90 of tube T is connected by a wire 106 to a line relay 107, the other side of which goes to a conductor 108. When a selector signal is received by the unit SM, the plate current in the amplifier half of tube T rises and energizes the line relay 107 through a circuit from the plus output terminal 58 of dynamotor 45 by wire connections 60, 100 and 108, through the relay winding, by conductor 106 through tube T, and by the ground wires 48 and 54 to the negative terminal 59.

The inclusion of the high resistor 115 in the charging circuit of condenser 110 requires the relay 107 to hold on for two seconds before the condenser is sufficiently charged to energize the relay 116 through conductor 118 and normally closed contact 119 upon release of relay 107. This prevents the operation of relay 116 by high amplitude noise pulses that might be picked up by the radio receiver 77.

The energized relay 116 closes all of its four front contacts 122 to 125 and locks up through its contact 124, which goes to the plus terminal 58 of dynamotor 45 through wire 126, closed switch 19, conductor 108 to point 127, and over the connected wires 100 and 60. The closed contact 123 energizes the dynamotor 44 and turns on the filaments of the recording amplifier RM. The energizing battery circuit for the dynamotor 45 goes from the negative battery terminal 42, wires 43 and 63, relay contact 123, and by wire 50 to the negative input terminal 47 of the dynamotor where the battery current goes through the motor windings to the plus input terminal 46. At the junction point 128 in wire 50, battery current goes through wire 129 to the filaments of the tubes in amplifier RM, which receives its plate voltage from the output terminals 51 and 52 of dynamotor 44.

The closed contact 122 of relay 116 energizes the vibrator power pack or converter 66 by connecting the negative battery lead 63 to the negative input terminal 73 of the power pack through a conductor 130. The A. C. output of energized unit 66 energizes the relay 120 and operates the power motor 14 which drives the crew shaft 21 and the cam assembly 26. At the same time the magnets 28 and 35 are energized by the battery 40 from the negative lead 63 through the closed contact 122 of relay 116, conductor 130 to point 130', through the normally closed contact 131 of a phasing relay 132 (not yet energized), by wire 133 through both magnets 28 and 35 in parallel, conductor 34, and through the closed switch 33 to the grounded plus terminal 41 of the battery. The energized magnet 28 releases the cam assembly 26 to close the wrapper that shapes the recording paper into a cylinder, and the energized magnet 35 locks the stylus shaft 38 so that the stylus can not start scanning until the phasing relay 132 is energized, to be described later.

The energized relay 120 closes its four front contacts 134 to 137 and at the same time opens its back contact 119. The closed contact 136 energizes the half-nut magnet 22 by connecting it through wires 138 and 139 to conductor 50, which goes to the negative battery terminal 42 through the closed contact 123 of the energized relay 116 and through conductor 63. The energized magnet 22 connects the half-nut 20 to the screw shaft 21, whereby the stylus carriage 16 begins to move forward. The operation of the half-nut lever 23 opens the switch contact 24 to remove the stylus grounding circuit, and the closing of switch contact 25 shorts out the resistor 61 in dynamotor 45 which now runs at full speed.

The closed contact 134 of energized relay 120 connects the plus output terminal 58 of dynamotor 45 to the plate input terminal 71 of the final amplifier tube in the combined frequency standard and amplifier unit 65. This circuit can be traced from terminal 58 through wires 60 and 100 to point 127, wire 108, closed contact 134, and by wire 140 to the terminal 71. The unit 65 is now energized and operates the stylus motor 15. However, the stylus shaft will not rotate at this point because it is held locked by the arm 36 of the energized magnet 35. The arm 36 in locking position also serves as a grounded connection for the stylus.

When the tongue contact 141 of the energized relay 120 changes from the back contact 119 to the front contact 137, it transfers the discharge path of condenser 110 through the phasing relay 132 over wire 142. At the same time the closed contact 135 of relay 120 shorts out the high resistor 115 and thereby prepares the circuit for the short phasing pulses sent out by the transmitter for an interval of two seconds or so at the end of the two-second silent interval which immediately followed the two-second selector tone.

The phasing pulses have the same frequency as the car selector signals but are of much shorter duration, lasting only a small fraction of a second, so that about fifteen or twenty pulses are sent out during the phasing interval through the line relay 107. The purpose of these short phasing pulses is to give greater phasing accuracy than would be possible with long pulses.

When the phasing relay 132 is energized by the discharge of condenser 110, it locks up through its closed contact 143, which connects the relay to the plus output post 58 of dynamotor 45 through the closed contact 144 of a relay 145 (not energized at this time).

The operation of the phasing relay 132 automatically performs several functions. The opened back contact 131 breaks the circuit of phasing magnet 35 to release the stylus shaft 38 for rotation. At the same time the circuit of magnet 28 is opened to remove it from the battery 40 and thereby conserve power. The release of magnet 28 does not affect the position of latch 27, which has already returned to locking position against the step 26b of cam disk 26, as explained earlier. The closed contact 146 of relay 132 provides a shunt path for the negative battery lead 63 through wires 147 and 130 to the negative input terminal 73 of the vibrator power pack 66. This path is in shunt to the one containing the closed contact 122 of the energized relay 116.

At this stage the recording of the message begins, with the slowly moving carriage 16 sliding the rapidly turning stylus axially through the stationary paper cylinder 12 on which the received facsimile signals are recorded. This recording operation is so well understood that it requires no explanation here. It need only be said that the received facsimile signals pass through the recording amplifier RM into the output transformer 79 which feeds the stylus circuit where the variable signal voltages cause the stylus to record a facsimile of the message on the inner surface of the electrically responsive recording paper.

When the recording of the message is completed, the carriage 16 will have moved far enough to open the end-of-message switch 19, which breaks the circuit of the power relay 116 from the plus output terminal 58 of dynamotor 45. The release of the relay 116 opens all its contacts with the following result:

The open contact 123 turns off the dynamotor 44 and disconnects the negative battery lead 63 from magnet 22, which deenergizes and releases the half-nut 20 from the screw shaft 21, whereupon the carriage 16 instantly returns to initial position. Let it be understood that the return of the carriage mechanically trips the latch 27 for a moment (independently of magnet 28) and the released cam 26 is operated by the motor 14 until the step 26a is again caught by the returned latch 27. During this interval the wrapper is opened and the recorded message is fed out for removal, all as fully explained in the Hallden application.

The opened contact 122 of relay 116 breaks the connection leading from the negative battery conductor 63 to the negative input terminal 73 of the power unit 66. However, this unit continues to supply power because the battery connection to terminal 73 remains closed through a shunt circuit including the wire 147 and the closed contact 146 of the phasing relay 132. Therefore, the motor 14 continues to run after the carriage 16 has returned in order to operate the mechanism that opens the wrapper and feeds a measured length of paper into the wrapper, at the same time projecting the recorded message out of the wrapper for cutting off.

The opened contact 125 of relay 116 breaks the grounding circuit of relay 132 through wire 142, so that this relay remains energized even though the returned carriage 16 has closed the grounding switch 17. Consequently, the open contact 131 of energized relay 132 keeps the magnet 35 deenergized, so that the stylus shaft 38 is free to rotate. In other words, during the return of carriage 16 to normal position, the stylus 13 (now free of signal voltage) continues to turn rapidly inside the paper cylinder. This protects the stylus from damage and also prevents it from tearing the message.

When the correct length of fresh paper has been fed into the open wrapper as previously mentioned, the arm 31 drops into the notch of cam 32 and thereby closes the switch contact 30. This energizes the magnet 29 which operates a knife (not shown) to shear off the recorded message that was projected out of the machine. The energizing of magnet 29 is only momentary, for the cam 32 continues to rotate and lifts up the arm 31, thereby breaking the magnet circuit and again closing the contact 33.

The momentary closing of contact 30 for the knife operation also energizes the relay 145 for the first time. This energizing circuit goes through wire 147 to the negative battery lead 63. The closed contact 150 of relay 145 maintains battery on the vibrator power unit 66, thereby keeping the motor 14 running to carry out the cutting operation.

The momentary opening of contact 144 of relay 145 breaks the locking circuit of the phasing relay 132 which now releases for the first time since it was energized by the discharge of condenser 110 at the phasing moment of the system. The closing of contact 131 of relay 132 places the cam controlling magnet 28 and the phasing magnet 35 in standby condition. These magnets are not energized at this moment because the switch contact 33 is open.

The opening of contact 146 of the released phasing relay 132 does not turn off the vibrator power pack 66 because that unit remains connected to battery 40 through the closed shunt contact 150 of the energized relay 145. The power motor 14 therefore stays on and turns the cam 32 until it lifts the arm 31 out of the notch to open the switch contact 30 and close the adjacent contact 33. The opened contact 30 breaks the circuit of relay 145, thereby disconnecting the power unit 66 and releasing the relay 120. The closed contact 33 puts the magnets 28 and 35 in condition to be energized when the power relay 116 is again operated. The entire equipment is now in its original standby condition ready to receive the next message.

*Sequence of operational steps*

The operation of the recorder car equipment will be clear from the foregoing detailed description but it will be convenient to add a summary of the various steps during a recording cycle.

When the hand switch 43′ is closed, the battery 40 lights the filament of tube T in the selector unit SM as well as the filaments in the tubes of the frequency standard 65. At the same time the dynamotor 45 starts up and runs at half speed owing to the resistor 61 in its motor circuit. The equipment is now in standby condition ready to receive signals from the main office.

When the main office has a message to transmit (say, to the car represented in the drawings), the operator broadcasts the selector signal of that particular car. That signal is a steady tone of fixed duration (for example, two seconds) and energizes the transformer 82 of the tuned selector circuit containing one of the condensers 86.

Normally the battery 93 keeps sufficient negative bias on the grids 89 and 91 of tube T to prevent it from operating. The selector signal output of transformer 83 overcomes this negative bias and causes the tube to conduct current through the line relay 107, which pulls up its contact 109 and causes the condenser 110 to become charged from the plus terminal 58 of dynamotor 45 (still running at half speed). We are assuming that it takes about two seconds for the condenser 110 to be fully charged. Shorter signals (like noise signals accidentally picked up), even if they energize the line relay 107, will not give the condenser 110 sufficient time to charge to the required level and will therefore have no effect on the equipment.

When the two-second selector tones ceases, there follows a two-second silent interval during which the following functions take place automatically:

The power relay 116 is energized by the condenser 110 discharging through the relay winding upon release of line relay 107.

The closed contact 123 of relay 116 turns on the filaments of the tubes in the recording amplifier RM and energizes the dynamotor 44 which provides the plate voltage for the same tubes.

The closed contact 122 of relay 116 connects the vibrator power unit 66 to battery 40 and thereby energizes the relay 120, starts the power motor 14, energizes the magnets 28 and 35, and connects the half-nut magnet 22 to the negative battery terminal 42 through the closed contact 136 of relay 120. The energizing of magnet 22 opens the switch contact 24 and removes the resistor 61 from the motor circuit of dynamotor 45.

The closed contact 134 of energized relay 120 energizes the frequency standard 65 by connecting its plate input terminal 71 to the plus output terminal 58 of dynamotor 45 which is now running at full speed by the removal of resistor 61. Consequently, during this two-second silent interval the stylus carriage 16 is connected to the screw shaft 21, but the stylus shaft is held back by the energized phasing magnet 35 while the released cam 26 frees the cam assembly and the wrapper mechanism is operated by the motor 14 to close the wrapper and shape the recording paper into cylindrical form for scanning. As soon as the carriage 16 starts to move, the grounding switch 17 opens and places the phasing relay 132 in condition to receive the phasing pulses.

After the two-second silent interval, the main office transmitter sends out a series of short phasing pulses for an interval of about two or three seconds, whereby the line relay 107 is again energized. During this phasing interval, the relay 107 releases intermittently and the charged condenser 110 discharges through the phasing relay 132, which is thus energized.

The opened contact 131 of relay 132 breaks the circuit of both magnets 28 and 35. The released magnet 28 holds the wrapper closed to maintain the paper in cylindrical form for recording, and the deenergized magnet 35 releases the stylus shaft 38 for operation by the synchronous motor 15. The machine is now ready to record the received facsimile signals which pass through the amplifier RM to the recording circuit.

*At the end of a message*

When the stylus carriage 16 reaches the end of its travel at the close of a recording operation, it opens the switch 19 and this automatically results in the following events:

The relay 116 falls off and opens all its contacts, but the relays 120 and 132 stay energized for the time being.

The magnet 22 is released (by the opening of contact 123 of relay 116) and the half-nut 20 disconnects the stylus carriage 16 from the screw shaft 21, so that the carriage returns instantly and the switch 19 recloses.

During its return movement, the carriage mechanically trips the latch 27 and frees the cam 26, whereby the wrapper is opened and the recorded sheet is ejected as a new length of paper is fed into the open wrapper. These wrapper opening and paper feeding operations, though started during the return movement of carriage 16, are completed after the carriage is back in normal position.

The release of magnet 22 closes the switch contact 24 and shorts the stylus 13 to ground. The opening of switch contact 25 cuts out the short circuit of resistor 61 in dynamotor 45 so that this machine starts to run again at half speed in standby condition.

The closing of switch 17 by the returned carriage has no effect because the relay 116 is already deenergized, but the closed switch 18 shorts out the resistor 76 in the circuit of motor 14, which therefore runs at full voltage to carry out the operations of opening the wrapper, feeding in new paper and cutting off the recorded sheet, which is projected out of the open wrapper.

The message cutting operation occurs when the arm 31 drops into the notch of cam 32 (driven by motor 14) just after the paper feed has stopped, whereupon the magnet 29 is energized and operates a knife. At the same time, the relay 145 is energized and its open contact 144 releases the phasing relay 132. The closed contact 150 of relay 145 keeps the vibrator power unit 66 energized, so that the motor 14 continues to run until the cam 32 lifts the switch arm 31 out of the notch and opens the switch 30. This deenergizes the knife magnet 29 and the relay 145. The open contact 150 of relay 145 kills the power unit 66 and the relay 120.

It should be noted that the relay 145 lets go before the switch contact 33 closes. Hence, the relay contact 150 is broken to prevent the reenergizing of magnets 28 and 35 upon the closing of switch 33, so that these magnets are restored to standby released condition. The machine is now shut down and is back to normal condition for the next recording operation.

A word may be added about the separation of selector and facsimile signals in the two units RM and SM. Since the selector circuit containing the inductance 85 and one of the condensers 86 is sharply tuned to a specific frequency (say, 1,000, 2,000, or 3,000 cycles, depending upon the position of the selector switch 84) facsimile signals coming over on a different frequency (for example, 2,300 or 2,400 cycles per second) are filtered out of the selector unit SM. If any facsimile signals should get through to the selector tube T, they cause no interference because they are of too-low amplitude owing to the loosely coupled transformer 83. Furthermore, the circuit of relay 197 has been disabled by this time.

While a small proportion of the selector and phasing signals (which have the same frequency) may enter the recording amplifier RM, they produce no effect because that amplifier has not yet been energized. The use of a selector and phasing frequency different from the facsimile signal frequency permits the use of a simpler and less current-consuming selector unit SM than was possible in prior installations of this kind where the same carrier frequency was employed for phasing and facsimile transmission.

*How battery drain is reduced*

As previously stated, the primary purpose of this invention was to reduce battery drain to a minimum by means of novel circuit arrangements and controls that enabled me to dispense with current-consuming apparatus heretofore included in recording equipments mounted on facsimile telegraph cars where all the power has to come from a storage battery. Furthermore, the new circuit controls in the present system cut down the time during which certain devices have to be energized. The principal factors in reducing battery drain will be clear from the following considerations.

In the present facsimile equipment, standby currents are far more important on the question of battery drain than are the recording currents. It may be assumed that the cars operating in Western Union's so-called Telecar System receive on the average about ten messages per hour. Since it takes only one minute to record a message, the recorder is active only ten minutes in one hour and kept in standby condition for the rest of the time. Therefore, it is necessary to keep the standby currents as low as possible.

When the car operator closes the hand switch 43' to place the equipment in standby condition, battery current will light the filaments of the frequency standard 65 and of the selector tube T. The dynamotor 45 will be energized but the resistor 61 cuts it down to half speed, which reduces the wear on this machine in addition to cutting down the current. The output terminal 53 of dynamotor 45 puts plus voltage on plate 88 of the selector tube T but no current is passing through. Therefore, keeping the equipment in standby condition requires battery current only for running the dynamotor 45 at low speed and lighting up the filaments of certain tubes. This standby power consumption has been found to be less than half of that required in prior equipments of this kind.

During the car selecting and phasing operation, the line relay 197 is on for only two 2-second intervals and stays off for the rest of the time. During a recording cycle the magnets 28 and 35 are on for only two seconds when the machine is phasing. The relay 145 is put on for only a second or two for the knife-cutting operation. Let it be remembered that each recording period lasts but one minute, so that the recording battery drain per hour is relatively small.

Reducing the drain on battery 40 not only prolongs its life but helps to maintain its voltage more nearly constant under all conditions and thereby improves the margin of operation of the entire equipment. These practical advantages have been demonstrated in the commercial operation of my invention.

*How the phasing pulses are produced (Figs. 3 and 4)*

It has been brought out in the description of the selector-amplifier unit SM in Fig. 1 that the selector signal and the phasing pulses for any one car have the same frequency, which however differs for each car so that only one car can be selected and phased at a time. A preferred method and apparatus for producing the short phasing pulses from the selector frequency are schematically illustrated in Figs. 3 and 4.

The transmitter equipment at the main office includes a frequency generator SQ of any approved construction, which can be set by a knob 160 to generate different frequencies, in this case one for each of three cars (like the three tuning condensers 86 in Fig. 1). This frequency generator is connected to the output line 161 which goes to the station's radio transmitter. A relay 162 has a pair of contacts 163 shunted across the line 161, so that when the relay is energized it shortsout the frequency generator and no signals from it go to the line.

The relay 162 is energized from a battery 164 which represents any suitable source of power. The relay circuit includes a metal commutator 165 which has a short insulating segment 166 and a contact arm 167 arranged to press against the commutator, which always rotates with the scanning drum or cylinder of the facsimile transmitter TR. This transmitter may be of any practical construction and by way of example I refer to the pending application of John H. Hackenberg, Serial No. 122,326, filed October 19, 1949, which shows a facsimile transmitter actually used with the recorder equipment herein disclosed. The small rectangle 168 in the circuit of relay 162 represents a control device (not a part of this case) for preventing the energizing of the relay after the scanning operation has started. For present purposes the action of the control device 168 may be disregarded.

As the commutator 165 rotates at the speed of the scanning drum, the circuit of relay 162 is briefly interrupted once for each revolution, and it is only during this brief interval that the relay contacts 163 are open to let the frequencies of generator SQ go over the line. During the two-second car selecting interval the relay 162 remains unoperated and does not therefore interfere with the transmission of the steady selector tone to the desired car.

After the car has been selected and is ready for the phasing pulses, the rotating commutator 165 causes the relay 162 to pulse in unison with the rotary speed of the scanning drum. Consequently, the steady tone of the selector frequency is interrupted for relatively long intervals to produce short pulses which are indicated in Fig. 4 by the wave groups 170.

It will be easier to understand Fig. 4 if we assume for purposes of explanation that the commutator rotates at 300 R. P. M. This causes five interruptions of relay 162 per second, so that five short pulses 170 separated by five long interruptions 171 are sent out each second during the phasing period, which usually lasts about two or three seconds. Accordingly, we may assume that ten or fifteen phasing pulses are transmitted to the selected recorder for the phasing operation to energize the line relay 107, as previously explained. This number of pulses has been found to assure the phasing of the recorder, even though each pulse lasts only about one-fiftieth of a second.

Of course, all of the above figures are not to be taken with mathematical accuracy, for Fig. 4 is merely an arbitrary diagram to explain how the short phasing pulses can be derived from the same unit that produces the car selector frequency. If only one car is considered, this selector frequency may be called the starting frequency, as I have done in some of the claims.

Although I have described my invention as facsimile equipment for a motor car, it will be evident that this equipment is applicable to other kinds of mobile stations, such as boats and airplanes. Therefore, when I refer to a vehicle in certain claims, I include any practical form of vehicle adapted to travel on the ground, or on water, or in the air. Further, wherever I have given specific figures of electrical values or time intervals, I have done so merely by way of example and not as a restriction in the scope of my invention as defined in the appended claims.

I claim as my invention:

1. In a facsimile telegraph system which derives its power from a storage battery, a recorder having a tuned device adapted to be energized only by signals of a particular frequency, a first relay for turning the power on and a second relay for phasing the recorder, means whereby said first relay is energized in response to the energizing of said device by a long starting signal, and circuit means controlled by the said first relay for causing the second relay to be energized only in response to the energizing of said device by short pulses of the same frequency as the starting signal.

2. In a facsimile telegraph system, a transmitter and a recorder adapted to be placed in operative communication, said recorder deriving its power from a local source, means at the transmitter for sending out a steady tone of a particular frequency, a tuned device at the recorder adapted to be energized by said steady tone, means at the recorder controlled by the energized condition of said device for turning on the power for the recorder, means at the transmitter for producing short phasing pulses of the same frequency as said steady tone, said tuning device being also energized by said short pulses, and means at the recorder operated in response to the energizing of said device by the phasing pulses to start the recording operation.

3. In a facsimile telegraph system having a transmitter provided with means for sending out a steady tone of a particular frequency, a recorder having a tuned device which is energized by said steady tone, means at a storage battery for supplying power to said recorder, whereby the energizing of said device by the steady tone places the recorder in operative condition, means at the transmitter operable after the conditioning of the recorder for periodically interrupting said steady frequency to produce a series of short phasing pulses which energize said tuned device, and means at the recorder operated in response to the energizing of said device by the phasing pulses to start the recording operation.

4. In a facsimile recorder which derives its power from a storage battery, a recording stylus mounted on a rotary shaft, a motor for operating said shaft, a locking device adapted to hold the shaft against rotation, said device being normally inoperative to permit rotation of the stylus shaft, a magnet adapted when energized to actuate said device to shaft locking condition, circuit connections for energizing said magnet from the battery, a relay energized in response to phasing pulses received by the recorder, and switch means operated by the energized relay to open the circuit of said magnet and thereby release the stylus shaft at the phasing moment of the machine to start the recording operation during which said magnet remains deenergized.

5. In a facsimile recorder which derives its power from a storage battery, a scanning carriage slidable from initial to final position during a recording cycle, a relay adapted to be momentarily energized in response to a received starting signal, a power unit, a locking circuit closed by said relay connecting the energizing relay to said power unit which keeps the relay in energized condition, normally deenergized means connected to be energized by said relay to prepare said recorder for reception of a message, and a normally closed switch in said locking circuit arranged in the path of said carriage so as to be opened by the carriage in final position to release said relay.

6. In a facsimile recorder which derives its power from a local source, a slidable stylus carriage normally held in initial position, a motor for operating said carriage which is normally uncoupled from the motor, a resistor in the motor circuit designed to let the motor run at proper recording speed, a switch shunted around said resistor and held closed by the carriage in its initial position, whereby said resistor is short circuited to let the motor run above recording speed before it is connected to the carriage, and means for connecting said carriage to the motor at a predetermined moment, whereby said switch is automatically opened when the carriage starts moving so as to place said resistor in circuit and thereby slow the motor down to recording speed.

7. In a facsimile recorder which derives its power from a storage battery, a dynamotor provided with means for causing it to run at low speed when energized by the battery for standby condition, a relay energized in response to a starting signal, a power unit energized by the battery in response to the energizing of said relay, a motor operated by the energized power unit, a scanning carriage normally disconnected from said motor, means including a magnet operated upon the energizing of said power unit to connect the carriage to the motor, circuit connections controlled by said energized magnet for causing said dynamotor to run at full speed, and a recording amplifier energized by the full-speed output of said dynamotor.

8. In facsimile equipment energized from a storage battery, a power motor, a movable scanning carriage normally disconnected from said motor, a magnet adapted when energized to connect the carriage to the motor, a normally open switch arranged to be closed when said magnet is energized, a dynamotor which runs at low speed when first energized by the battery, and means for causing said dynamotor to operate at full speed when said switch is closed.

9. In facsimile recorder equipment energized from a storage battery, scanning mechanism including a slidable carriage adapted to travel from initial to final position, a rotary stylus mounted on said carriage for scanning a sheet, a power relay energized in response to received starting signals, a motor energized in response to the energizing of said relay to operate the carriage, a phasing relay adapted to be energized in response to the receipt of phasing pulses, a normally closed switch for shorting out said phasing relay when the power relay is energized before receipt of the phasing pulses, means whereby the movement of said carriage from initial position automatically opens said switch to condition said phasing relay for operation by the phasing pulses, and means controlled by the energizing of the phasing relay to start the rotation of said stylus.

10. In a facsimile recorder energized from a storage battery, a power relay adapted to be energized in response to the receipt of starting signals for turning the power on, a locking circuit for holding said relay energized, a normally closed switch in said locking circuit, a phasing relay energized in response to the receipt of phasing signals after said power relay has been energized, means including a normally closed switch for shorting out the phasing relay upon the energizing of said power relay before the phasing pulses are received, a scanning carriage operable from initial to final position and adapted to open said normally closed switch upon starting to move forward in response to the operation of said power relay, and a second normally closed switch arranged to be opened when the carriage reaches its final position to deenergize said power relay.

11. In a facsimile recorder energized from a storage battery, a pair of input lines for receiving signals from a distant transmitter, a recording amplifier connected to said lines for receiving facsimile signals on a carrier of a certain frequency, a transformer having its primary coil connected to said input lines in shunt to said recording amplifier, a selector-amplifier unit having a tuned circuit effectively responsive only to selector signals of a frequency different from the carrier frequency, said tuned circuit being connected to the secondary coil of said transformer, a vacuum tube in said selector-amplifier normally inoperative and adapted to be energized by selector signals passing through said tuned circuit, said transformer being constructed as a loosely coupled step-down device which so reduces the amplitude of facsimile signals getting through said tuned circuit that they fail to energize said tube.

12. In a facsimile recorder energized from a storage battery, a pair of input lines for receiving signals from a distant transmitter, a recording amplifier connected to said lines for receiving fasimile signals on a carrier of a certain frequency, a loosely coupled step-down transformer having its primary coil connected to said input lines in shunt to said recording amplifier, a selector-amplifier unit having a tuned circuit effectively responsive only to signals of a selected frequency different from those of the carrier frequency, said tuned circuit being connected to the secondary coil of said transformer, a vacuum tube in said selector-amplifier unit normally inoperative and adapted to be energized by selector signals passing through said tuned circuit, a line relay in the plate circuit of said tube so as to be energized only when the tube passes current, capacitive means connected to said plate circuit and discharging through the relay, and means for energizing said recording amplifier in response to the release of said relay.

13. In a facsimile recorder designed to operate from a storage battery, power equipment comprising two dynamotors, an amplifying frequency standard and a vibrating converter, these four units being energized by said battery, a starting amplifier having a tuned selector circuit, said frequency standard and starting amplifier containing vacuum tubes, circuit connections whereby the initial closing of the battery circuit lights the tube filaments in said frequency standard and starting amplifier, means for initially keeping one of said dynamotors at low speed, a recording amplifier for passing facsimile signals to be recorded, a relay so connected as to be energized in response to the receipt of said selector signals by said tuned amplifier, other circuit connections responsive to the energizing of said relay for energizing said converter and the other dynamotor and causing the slow running dynamotor to operate at full speed, said other dynamotor energizing the recording amplifier, a power motor connected to the output of said converter, and a stylus motor connected to the output of said frequency standard.

14. In a facsimile telegraph system in which a main officer transmitter is adapted to connect by radio with any one of a plurality of vehicles provided with recording equipment energized from a local source of power which includes a selector unit tuned to be energized only by signals of a particular frequency, this selecting frequency being different for each vehicle, means at the transmitter for generating a steady selector tone of the frequency desired to energize the selector unit of the desired vehicle, means whereby the energizing of a vehicle's selector unit by said steady tone automatically places the recording equipment of that vehicle in an operative condition, means at the transmitter operable after selection of the desired vehicle for periodically interrupting its selector frequency to produce a series of phasing pulses which energize the selector unit of the vehicle, and phasing means on the vehicle operated in response to the energizing of said selector unit by the phasing pulses to start the recording operation.

15. In a facsimile telegraph system in which a main office transmitter is adapted to connect by radio with any one of a plurality of vehicles provided with recording equipment designated to operate from a storage battery which includes a selector unit tuned to be energized only by signals of a particular frequency which is different for each vehicle, means at the transmitter for generating a steady selector tone of the frequency required to energize the selector unit of the desired vehicle, a first relay in the vehicle equipment adapted when energized to turn on the power for the recording mechanism, a second relay adapted when energized to phase the recording mechanism, means whereby the energizing of a vehicle's selector unit by the steady selector tone causes the first relay to be energized, means at the transmitter operable after selecting the desired vehicle for periodically interrupting the selector frequency to produce a series of phasing pulses which energize the selector unit of the vehicle, and means on the vehicle for causing the second relay to be energized in response to the energizing of the selector unit by the received phasing pulses.

References Cited in the file of this patent

UNITED STATES PATENTS

| Number | Name | Date |
|---|---|---|
| 2,396,286 | Ridings | Mar. 12, 1946 |
| 2,537,199 | Wise | Jan. 9, 1951 |